US011624399B2

(12) United States Patent
Diew et al.

(10) Patent No.: US 11,624,399 B2
(45) Date of Patent: Apr. 11, 2023

(54) MECHANICAL SYSTEM COMPRISING A SHAFT COUPLED TO A BEARING, AND METHOD FOR MANUFACTURING SUCH A SYSTEM

(71) Applicant: H.E.F., Andrezieux Boutheon (FR)

(72) Inventors: Mohamadou Bocar Diew, Amilly (FR); Yves René Alexis Gachon, Saint-Just-Saint-Rambert (FR); Fabrice Prost, Saint-Etienne (FR)

(73) Assignee: H.E.F., Andrezieux Boutheon (FR)

( * ) Notice: Subject to any disclaimer, the term of this patent is extended or adjusted under 35 U.S.C. 154(b) by 0 days.

(21) Appl. No.: 16/626,594

(22) PCT Filed: Jul. 3, 2018

(86) PCT No.: PCT/FR2018/051649
§ 371 (c)(1),
(2) Date: Dec. 26, 2019

(87) PCT Pub. No.: WO2019/008266
PCT Pub. Date: Jan. 10, 2019

(65) Prior Publication Data
US 2020/0132111 A1 Apr. 30, 2020

(30) Foreign Application Priority Data

Jul. 3, 2017 (FR) ...................................... 1756265
Jul. 19, 2017 (FR) ...................................... 1756841

(51) Int. Cl.
*F16C 9/04* (2006.01)
*F16C 33/10* (2006.01)
(Continued)

(52) U.S. Cl.
CPC ............ *F16C 9/04* (2013.01); *F16C 33/1065* (2013.01); *F02F 3/00* (2013.01);
(Continued)

(58) Field of Classification Search
CPC .... F16C 9/02; F16C 9/04; F16C 11/02; F16C 33/1065; F16C 33/107; F02F 7/0053; F16F 15/1435; F16F 15/1442; F16J 1/16
See application file for complete search history.

(56) References Cited

U.S. PATENT DOCUMENTS 5,181,783 A * 1/1993 Sherman ............... F16C 17/026
384/100
5,366,298 A * 11/1994 Toshimitsu ........... F16C 17/107
384/100
(Continued)

FOREIGN PATENT DOCUMENTS

EP     E P-0661470 A2 *  7/1995 .............. F16C 29/02
EP         1411145           4/2004
(Continued)

OTHER PUBLICATIONS

Machine translation of description provided by ESPACENET of FR 2974399 A1 (Year: 2021).*
(Continued)

*Primary Examiner* — Michael A Kessler

(57) ABSTRACT

The present invention relates to a mechanical system (1), comprising a bearing (4) and a shaft (10) coupled to the bearing (4), especially for an internal combustion engine, being subjected to average contact pressures of less than 200 MPa. The shaft (10) has at least one area (12) provided with an anti-seizing surface coating (20), having a surface hardness at least twice that of the bearing (4), and a microtexturation (30) comprised of a set of individual microcavities
(Continued)

(31), distributed in said area (12). The invention also relates to a method for manufacturing such a mechanical system (1).

10 Claims, 4 Drawing Sheets

(51) Int. Cl.
*F16C 33/04* (2006.01)
*F02F 3/00* (2006.01)

(52) U.S. Cl.
CPC .... *F05C 2201/0448* (2013.01); *F16C 33/043* (2013.01); *F16C 2202/04* (2013.01); *F16C 2204/10* (2013.01); *F16C 2360/22* (2013.01)

(56) References Cited

U.S. PATENT DOCUMENTS

| | | | | |
|---|---|---|---|---|
| 5,620,262 | A * | 4/1997 | Kumada | F16C 33/107 384/276 |
| 6,886,521 | B2 * | 5/2005 | Hamada | F16G 13/06 123/193.4 |
| 7,318,847 | B2 | 1/2008 | Massler et al. | |
| 2003/0128903 | A1 | 7/2003 | Yasuda et al. | |
| 2005/0175837 | A1 | 8/2005 | Massler et al. | |
| 2006/0083451 | A1 * | 4/2006 | Kawagoe | F16C 33/206 384/276 |
| 2014/0037236 | A1 * | 2/2014 | Kobayakawa | F16C 33/206 384/397 |
| 2016/0201799 | A1 * | 7/2016 | Henry | C23C 16/27 92/172 |

FOREIGN PATENT DOCUMENTS

| | | | |
|---|---|---|---|
| EP | 2290119 | 3/2011 | |
| ER | 2974399 | 10/2012 | |
| ER | 3013792 | 5/2015 | |
| JP | 2002147459 A * | 5/2002 | ............ F16C 33/124 |
| JP | 2005-127415 | 5/2005 | |
| WO | WO 2008/072548 | 6/2008 | |
| WO | WO 2015/097159 | 7/2015 | |
| WO | WO 2016/001021 | 1/2016 | |
| WO | WO 2019/008266 | 1/2019 | |

OTHER PUBLICATIONS

Rapport de Recherche Internationale et l'Opinion Ecrite [International Search Report and the Written Opinion] dated Nov. 12, 2018 From the International Searching Authority Re. Application No. PCT/FR2018/051649 and Its Translation of Search Report Into English. (17 Pages).

* cited by examiner

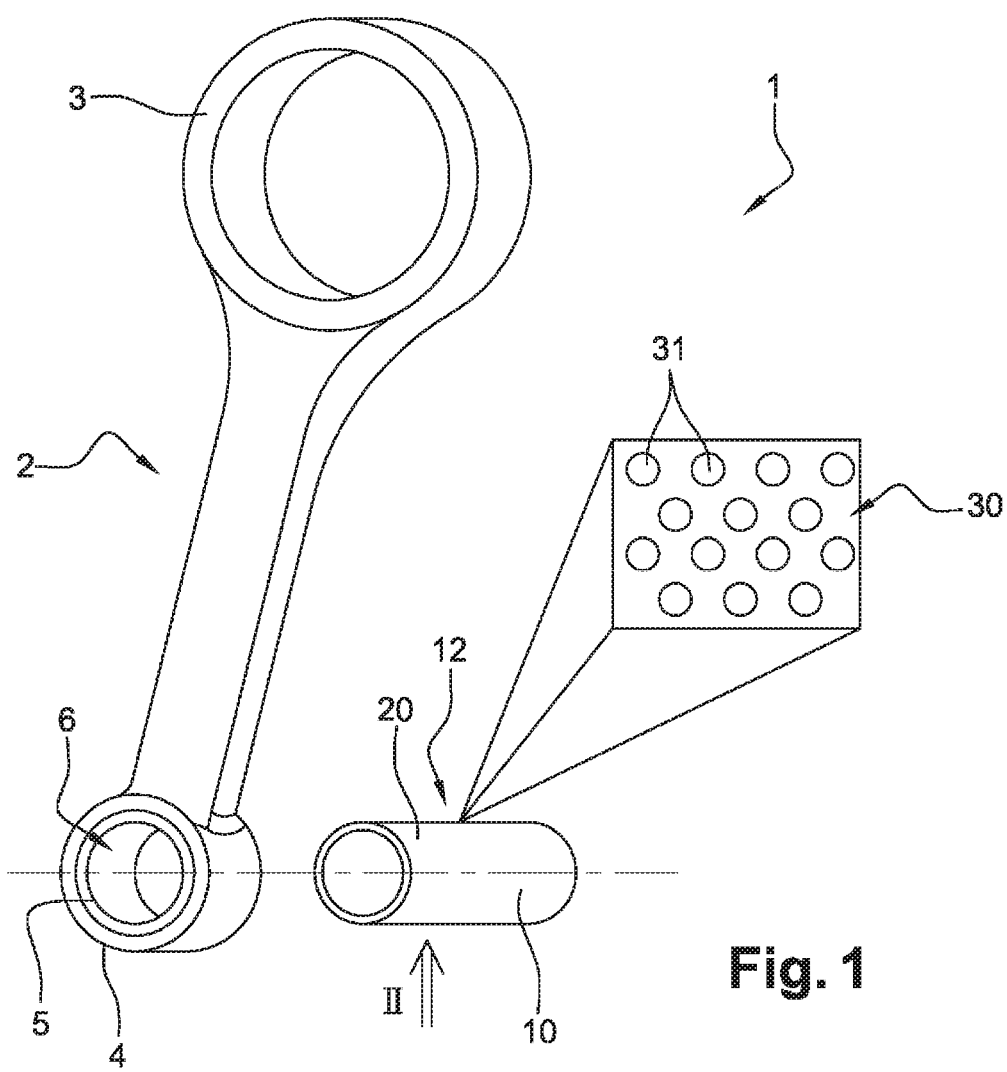
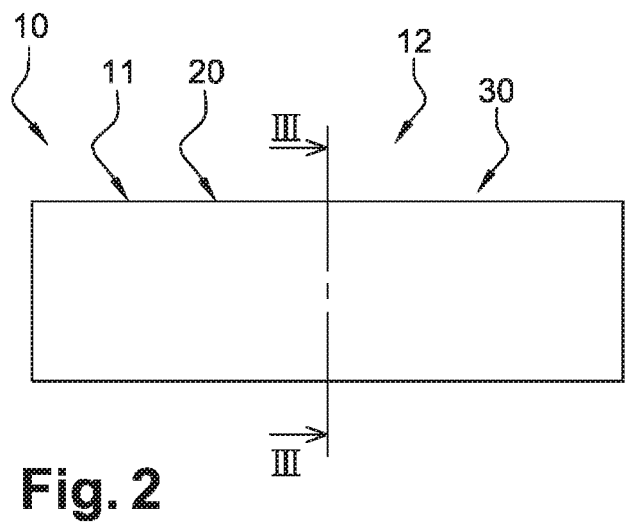
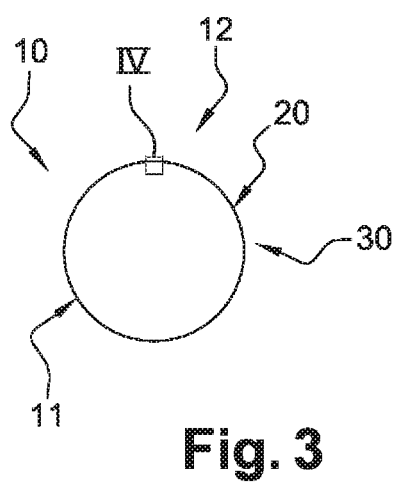
Fig. 1
Fig. 2
Fig. 3

MECHANICAL SYSTEM COMPRISING A SHAFT COUPLED TO A BEARING, AND METHOD FOR MANUFACTURING SUCH A SYSTEM

RELATED APPLICATIONS

This application is a National Phase of PCT Patent Application No. PCT/FR2018/051649 having International filing date of Jul. 3, 2018, which claims the benefit of priority of French Patent Applications Nos. 1756841 filed on Jul. 19, 2017 and U.S. Pat. No. 1,756,265 filed on Jul. 3, 2017. The contents of the above applications are all incorporated by reference as if fully set forth herein in their entirety.

FIELD AND BACKGROUND OF THE INVENTION

The present invention relates to a mechanical system comprising a shaft coupled to a bearing receiving said shaft, particularly equipping an internal combustion engine. The invention also relates to a method for manufacturing such a system.

The field of the invention is that of mechanical systems for fastening a shaft performing a rotational or oscillatory motion. As a non limiting example, the invention relates to shaft-bearing systems equipping internal combustion engines, particularly in the automotive sector, such as systems comprising a piston shaft or rocker arm shaft.

The primary problem observed in such a tribosystem, which is subjected to severe, repeated stresses, relates to phenomena of contact surface wear between the bearing and the shaft that passes through it.

Traditionally, a piston shaft is made of steel, with low surface roughness and a DLC (diamond-like carbon) coating, while the borehole of the bearing is optionally equipped with a copper-alloy ring. Alternatively, the borehole of the bearing may be made of steel or an aluminum alloy, or a composite material.

For the shaft, the surface degradations come in the form of gentle wear on the coating, which may potentially degenerate into seizing. For the bearing, the damage comes in the form of wear that leads to increased space between the parts. Once the space becomes too large, the engine becomes noisy and ends up functioning less well. Thus, it is important for the two opposing surfaces to not become worn, so that the anti-seizure coating plays its role and the space between them is preserved.

To preserve that space, one of the difficulties arises from the fact that the anti-seizure coating is harder than the metal bearing, which is much softer. A known industrial constraint for remedying this problem is to minimize the peak roughness factor, which may be referred to by the parameter RPk. In the state of the art, the anti-seizure coating must have an RPk less than 0.08 µm.

To date, the problem of damage to DLC coatings on shafts has not been completely solved.

To encourage lubrication, it is known to carry out macroscopic machining in the borehole with a lubricant reservoir function, generally oil. This makes it possible to ensure enough oil is added, in order to dissipate the calories generated by friction at the contact interface between the shaft and the borehole.

Furthermore, micrometric surface structures may be used to trap debris generated at the contact surface. This makes it possible to limit abrasive wear related to particles that come from the surface of the shaft or bearing.

EP1411145 describes one example of a shaft comprising an anti-seizure surface coating. That document describes a surface roughness comprising peaks and pits, which are linked to one another. In other words, that document does not describe microtexturing formed by a set of separated microcavities.

US2003/128903 describes a mechanical system comprising two sliding elements, such as a bearing and a shaft coupled to the bearing, equipping an internal combustion engine. As examples, the bearing may be made of a CuPb, AlSiSn, or similar alloy. At least one of the sliding elements comprises microtexturing formed by a set of separated microcavities. The only coating example mentioned in that document is MoS2, stating that the use of such a coating is expensive and does not make it possible to achieve sufficient durability due to its wear. That document does not consider the use of a coating as a satisfactory solution, and seeks an alternative with microcavities.

FR2974399 describes another example of a mechanical system equipping an internal combustion engine, comprising a piston shaft articulated on a crankshaft connecting rod. The piston shaft is provided with a DLC type coating and surface texturing, comprising a groove forming a lubricant drainage channel, and a set of intersecting striations. Such texturing is complex and therefore expensive to carry out. Additionally, that document does not include any tests demonstrating the achieved performance, nor any numerical values regarding the sizing of the texturing.

WO2007/031160 describes another example of a mechanical system equipping an internal combustion engine, comprising two elements whose contact surfaces rub against one another. The first element may be a crankshaft trunnion, or a piston shaft, while the second element is a connecting rod borehole.

Preferably, one of the elements comprises a surface coating having dry lubrication properties, while the other element comprises cavities intended to catch debris from the coating and/or additional liquid lubricant. According to a specific embodiment, both elements comprise cavities.

Yet again, that document does not present any tests demonstrating the achieved performance. Furthermore, that document does not specifically mention the dimensional characteristics of the cavities, for obtaining satisfactory performance while in service.

Thus, the efficacy of the above solutions has not been demonstrated for the application in question. Further, those solutions may entail substantial production costs.

SUMMARY OF THE INVENTION

The aim of the present invention is to propose a satisfactory solution in terms of resistance to seizure and wear.

To that end, one object of the invention is a mechanical system comprising a bearing and a shaft coupled to the bearing, particularly equipping an internal combustion engine, and subjected to average contact pressures less than 200 MPa, characterized in that the shaft comprises at least one area provided with:
  an anti-seizure surface coating, having a surface hardness at least twice that of the bearing, and
  a microtexture formed by a set of separated microcavities, distributed within said area.

According to other advantageous features of the invention, considered alone or in combination:

The anti-seizure surface coating of the shaft has a surface hardness at least three times that of the bearing.

The anti-seizure surface coating of the shaft has a surface hardness at least six times that of the bearing.

Each of the microcavities has a greatest length of between 15 and 100 micrometers, and a depth of between 50 nm and 100 μm. Thus, the depth of the microcavities may be selectively greater or less than the thickness of the surface coating.

Each of the microcavities has a form ratio less than or equal to 1, defined as the ratio between the depth and the greatest length.

The microcavities are distributed within said area with a surface density of between 5 and 30%, this surface density being defined as the ratio between the total area of the microcavities and the total area of said area including these microcavities.

The depth of the outer microcavities is less than the thickness of the surface coating. In other words, the outer microcavities are confined to the thickness of the coating.

The depth of the outer microcavities is greater than the thickness of the surface coating. In other words, the outer microcavities may penetrate into the base material of the shaft, underneath the coating.

All of the microcavities have the same geometry, with similar dimensions (depth and length or diameter). In practice, the degree of similarity between the dimensions of the microcavities depends on the precision of the microtexturing process used. Within the context of the invention, it is assumed that the microcavities have similar dimensions when the dimensional variations remain between double (×2=+100%) and half (divided by 2=−50%) the mean dimensions of the microcavities. As an example, this definition excludes dimensional variations on the order of the next decimal place (×10=+900%) or previous one (divided by 10=−90%).

All of the microcavities comprise at least: a first type of microcavities having a first geometry; and a second type of microcavities having a second geometry different from the first geometry, with different shapes and/or dimensions. The shapes particularly correspond to various cross-sections: circular, elliptical, rectangular, triangular, etc. In the context of the invention, it is assumed that the microcavities of the second type have different dimensions when their dimensions are greater than double (×2=+100%) or less than half (divided by 2=−50%) the mean dimensions of the microcavities of the first type.

The microcavities are distributed within said zone in a predetermined pattern so as to form a rectangular, square, triangular, or hexagonal network of microcavities on the surface of the material. The spacing between the center of one microcavity and the centers of the neighboring microcavities within a given pattern are between 1 and 10 times the value of one of the longitudinal dimensions (length or diameter) of the microcavities.

The microcavities are distributed within said area in a random pattern. The spacing between the center of one microcavity and the centers of the neighboring microcavities are randomly comprised between 0.1 and 10 times the value of one of the longitudinal dimensions of the microcavities.

The shaft has a cylindrical outer surface entirely covered by the surface coating and the microtexturing.

The shaft has a cylindrical outer surface comprising a single localized area covered by the surface coating and the microtexturing, that area at least partially covering the surface portion intended to rub against the bearing.

The shaft has a cylindrical outer surface comprising a plurality of distinct areas covered by the surface coating and the microtexturing, those areas at least partially covering the surface portion intended to rub against the bearing.

The anti-seizure surface coating has a surface hardness at least twice that of the shaft.

The anti-seizure surface coating is made from amorphous carbon of the DLC type.

The anti-seizure surface coating is of the nitride type (CrN, MoN, . . . ).

The anti-seizure surface coating is of the carbide type (CrC, SiC, . . . ).

The shaft is a piston shaft, housed in a piston and within a bearing belonging to a crankshaft connecting rod.

The shaft is a rocker arm shaft housed within a bearing belonging to a rocker arm.

The shaft is a trunnion housed in a line bearing.

The shaft is a crank pin housed in a big end bearing.

The line bearing/big end bearing may be equipped with bearing shells.

The bearing may be made of steel, copper or a copper alloy, aluminum or an aluminum alloy, composite materials, etc.

A further object of the invention is a method for manufacturing a mechanical system such as that described above, characterized in that it comprises:

a coating step consisting of applying the anti-seizure surface coating in said area of the shaft, and a microtexturing step consisting of forming all of the microcavities in said area.

According to different embodiments of such a method:

The coating step is carried out before the microtexturing step.

The microtexturing step is carried out before the coating step.

The surface coating is applied only in said area.

The microtexturing is applied only in said area.

The surface coating is applied beyond said area.

The microtexturing is applied beyond said area.

The microtexturing step is carried out with a microtexturing installation that maintains constant settings. For example, when the microtexturing installation is a laser ablation machine, the same power, fluence, repetition frequency, and shaping settings of the laser beam are maintained, as well as those of relative motion between the laser beam and the shaft, relative speed between the laser beam and the shaft, and distance between the head and surface of the shaft.

The microtexturing step is carried out with a microtexturing installation successively configured with two different settings, or is successively carried out with two microtexturing installations having different settings, so that the set of microcavities comprises at least: a first type of microcavities and a second type of microcavities having different geometries.

Unexpectedly, in the field of contact pressures wherein the mechanical system comprising the shaft coupled to the bearing operates, namely mean contact pressures less than 200 MPa, the depth of the microcavities may be greater or less than the thickness of the coating without this reducing the seizure and wear resistance improvements presented in the remainder of the document. Likewise, the order in which the coating and microtexturing steps are carried out has no influence on the performance improvement provided by the invention.

BRIEF DESCRIPTION OF THE SEVERAL VIEWS OF THE DRAWINGS

The invention will be better understood upon reading the following description, given solely as a non-limiting example, and made with reference to the accompanying figures wherein:

FIG. 1 is a perspective view of a mechanical system according to the invention, comprising a connecting rod and a piston shaft compliant with the invention;

FIG. 2 is an elevation view of the shaft along the arrow II in FIG. 1;

FIG. 3 is a cross-section along line III-III in FIG. 2;

DESCRIPTION OF SPECIFIC EMBODIMENTS OF THE INVENTION

Figure 4:
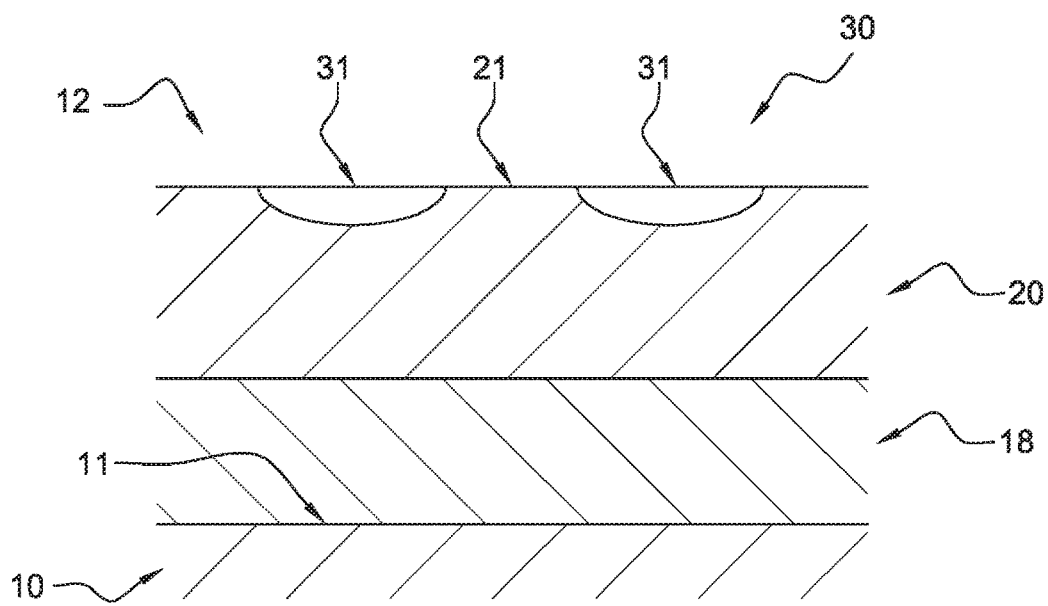
FIG. 4 is a larger scale view of the detail IV in FIG. 3.

FIGS. 1 to 4 depict a mechanical system 1 according to the invention, designed to equip an internal combustion engine of a motor vehicle.

The mechanical system 1 comprises a connecting rod 2 and a piston shaft 10, also according to the invention.

The connecting rod 2 comprises a big end forming a first bearing 3, and a small end forming a second bearing 4, which comprises a bronze ring 5 delimiting a cylindrical borehole 6.

The piston shaft 10 is intended to be installed in the bearing 4, more specifically in the borehole 6 of the bronze ring 5.

Alternatively, the bearing 4 may be without the ring 5. The shaft 10 then is housed directly in the borehole of the bearing 4.

The piston shaft 10 comprises a cylindrical outer surface 11 provided with a thin layer of anti-seizure coating 20 made of DLC amorphous carbon.

Alternatively, the coating 20 may be made of molybdenum nitride MoN or Mo2N, or any other anti-seizure material.

The coating 20 constitutes a surface hardening treatment with a tribological function. The coating 20 makes it possible to improve the seizure resistance of the shaft 10, compared to an untreated shaft. In other words, the coating 20 has an outer surface 21 with a better seizure resistance than that of the surface 11.

Furthermore, the coating 20 has a surface hardness greater than that of the surface 11 of the shaft 10. Preferably, the coating 20 is at least twice as hard as the surface 11.

Furthermore, the coating 20 has a surface hardness greater than that of the surface 11 of the shaft 10. Preferably, the coating 20 is at least twice as hard as the surface 11.

Additionally, the coating 20 has a surface hardness greater than that of the borehole 6 of the bearing 4. Preferably, the coating 20 is at least twice as hard as the bearing 4.

Thus, the coating 20 makes it possible to avoid seizure of the piston shaft 10 in the bearing 4 of the connecting rod 3.

The piston shaft 10 comprises a sublayer 18 formed between the surface 11 and the coating 20. By way of non limiting examples, the sublayer 18 may be composed of chromium or chromium nitride.

The piston shaft 10 further comprises outer microtexturing 30 formed by a set of separated microcavities 31 (micrometer-scale cavities), evenly distributed on the surface 11. The microtexturing 30 is intended to reduce the wear speed of the coated shaft 10 and the bearing 4. In practice, reducing the wear speed is a major challenge to preserve the anti-seizure properties of the coating 20 and maintain the clearances between the shaft 10 and bearing 4, and therefore preserve the mechanical function.

The microcavities 31 form a discontinuous outer pattern on the surface 11. The microcavities 31 have the same geometry, dome-shaped with a circular cross-section, delimiting an area whose depth decreases from the edge of the dome to the center.

As shown in FIG. 4, the microtexturing 30 is formed in the coating layer 20, such that the microcavities 31 are open at the surface 21 of the coating 20.

Each of the microcavities 31 has substantially equal dimensions, which are very slightly different given the precision of the laser beam. Within the context of the invention, it is assumed that the microcavities 31 have similar dimensions when the dimensional variations remain between double (×2=+100%) and half (divided by 2=−50%) the mean dimensions of the microcavities 31. As an example, this definition excludes dimensional variations on the order of the next decimal place (×10=+900%) or previous one (divided by 10=−90%).

In order to achieve the desired performance, the microcavities 31 have a diameter between 15 and 100 micrometers, and a depth of between 50 nm and 100 μm. When the dimensions are less than or greater, the tribological behavior of the shaft 10 in the bearing 4 is not satisfactory.

Advantageously, each of the microcavities 31 has a form ratio less than or equal to 1. This form ratio, defined as the ratio between the depth and the greatest length, is optimal to effectively reduce the wear speed of the anti-seizure coating on the shaft 10 and the wear of the bearing 4.

Furthermore, the microcavities 31 are distributed across the surface 11 with a surface density of between 5 and 30%. This surface density is defined as the ratio of that area of the surface 11 which is covered by the microcavities 31 to the total area of the surface 11.

In practice, the sublayer 18 is first applied to the surface 11, for example by reactive or non-reactive magnetron cathode sputtering.

Next, the coating layer 20 is applied to the layer 18, for example by vacuum deposition according to a physical vapor deposition (PVD) process or a plasma-assisted chemical vapor deposition (PACVD) process.

Finally, the microtexturing 30 is carried out deterministically on the surface 21 of the coating 20, using a LASER (Light Amplification by Stimulated Emission of Radiation) protocol, more specifically called laser ablation.

Alternatively, the microtexturing 30 may be carried out deterministically by plastic deformation replication (for example with a tool that has positive patterns of the microtexturing to be carried out), by chemical treatment (with a gate or mask), or any other technique that makes it possible to achieve the desired characteristics for the microtexture 30 in terms of its shape, dimensions, density, and distribution.

In the example of FIGS. 1 to 4, the surface 11 is fully covered by the coating and the microtexturing 30. In other words, the entire surface 11 is likely to form a friction area 12 provided with coating 20 and microtexturing 30.

A series of tests was conducted on a testbed dedicated to piston shafts, designed to simulate the tribosystem of a piston shaft in a crankshaft connecting rod of an internal combustion engine. The tests have different configurations of materials and microtexturing dimensioning. A protocol has been put in place to distinguish the various solutions tested.

For each test, the tested shaft is made of quenched low-alloy steel whose surface hardness is 635 HV. The shaft and bearing have a diameter of 25 mm, with a diametrical clearance of 20±5 μm. The width of the bearing is 19 mm. The bearing is equipped with a ring 5 opposite the shaft 10.

Some shafts have a DLC amorphous carbon coating of the hydrogenated a-C:H type, having a thickness of 2 μm on a chromium nitride sublayer 0.7 μm thick. Other shafts have a DLC amorphous carbon coating of the non-hydrogenated ta-C type, having a thickness of 0.7 μm on a Cr sublayer about 0.3 μm thick. The hardness ratio of the DLC a-C:H coating and the shaft is 3.5, while the hardness ratio of the DLC ta-C coating and the shaft is 7.

The microtexturing is formed of dome-shaped microcavities, produced by a femtosecond laser.

The tests are carried out in an environment heated to 180° C., at a load of kN, i.e. an applied Hertz pressure of 37 MPa, 45 MPa, and 52 MPa respectively for the aluminum, copper, and steel or coated steel antagonists. The duration of each test is 4 hours.

The tests are detailed in Tables 1, 2, and 3 below.

Table 1 shows the influence of the surface materials in contact. More specifically, it shows the hardness ratio of the materials, the observation of the surfaces, and the damage to the coatings and wear to the shaft and/or bearing if any. The tested surfaces do not contain microtextures. The hardness ratio defined by the hardness ratio of the shaft coating and that of the bearing varies from 1 to 20.

The various configurations of non-textured materials all have a non-compliance. That non-compliance may be related to coating wear on the shaft, when the coating hardness Hv1 is at least twice that of the surface of the bearing Hv2 (tests 1-3, 5). For a hardness ratio Hv1/Hv2 less than or equal to 1, flaking of the coating on the shaft and wear on the bearing 15 μm deep also make that configuration non-compliant (test 4).

These examples illustrate the problem posed by smooth surfaces and the influence of the hardness ratio of the antagonists.

Table 2 shows the influence of the microtexturing density on the coated shaft, with hardness ratios between 5 and 16.7. Microcavities 50 μm in diameter and 500 nm deep are produced on the shaft.

Densities between 5 and 30% (tests 6 to 11, 14 to 17 and 19 to 22) show very low wear (<0.1 μm) on the shaft coating, which illustrates the advantageous effect achieved by the invention. Simultaneously, the wear is not measurable on the bearing. The microtexturing of tests 6 to 11, 14 to 17 and 19 to 22 therefore afford protection to the coated shaft, without leading to bearing damage, independently of the nature of the material constituting the bearing.

On the other hand, for a density over 30% (tests 12, 13, 18, and 23), significant wear is observed on the bearing, so that those configurations are classified as non-compliant.

Table 3 shows the influence of the dimensional parameters of the microtexturing, i.e. the size (greater length) and depth of the microcavities.

Tests 24-32, carried out with microtexturing whose greatest dimension varies from 50 to 90 μm, for depths of 500 nm to 50 μm, are compliant with the criteria of the invention. For those tests, very little wear (<0.1 μm) is measured on the shaft coating.

Tests 33 and 34, conducted with microtexturing sizes greater than 100 μm on the largest dimension, make it possible to observe coating wear on the shaft for tests 33 and 34, which makes them non-compliant with the invention.

Test 36 is carried out with the macroscopic texturing described in patent FR2974399. It shows a non-compliance due to 4 μm of bearing wear and at least 0.2 μm of shaft wear. The texture described in that document does not meet the criteria desired for the invention, namely protecting the coating of the shaft and bearing from wear.

LEGEND OF COLUMN DESIGNATIONS IN THE RESULTS TABLE

A Test number
B Nature of the coating on the shaft
C Nature of the antagonist ring
D Hardness ratio Hv1/Hv2
   Hv1: hardness of the shaft's anti-seizure surface coating
   Hv2: hardness of the antagonist bearing of the shaft
E Type of texturing
F Density of the textures (%)
G Dimensions of the textures (μm)
H Depth (μm)
I Form factor
J Shaft wear
K Ring wear
L Compliant (C) or non-compliant (NC)
M Reason for non-compliance

TABLE 1

Effect of the materials and their hardness on the wear of the shaft and bearing

| A | B | C | D | E | F | G | H | I | J | K | L | M |
|---|---|---|---|---|---|---|---|---|---|---|---|---|
| 1 | a-C:H | Copper | 8.3 | No texture | 0% | 0 | 0 | 0 | 2.2 μm | not measurable | NC | deposit wear on shaft |
| 2 | a-C:H | Aluminum | 20 | No texture | 0% | 0 | 0 | 0 | 2.0 μm | not measurable | NC | deposit wear on shaft |
| 3 | a-C:H | Steel | 5 | No texture | 0% | 0 | 0 | 0 | 2.1 μm | not measurable | NC | deposit wear on shaft |
| 4 | a-C:H | a-C:H | 1 | No texture | 0% | 0 | 0 | 0 | not measurable | 15 μm | NC | deposit flaking on shaft + bearing wear |
| 5 | ta-C | Copper | 16.7 | No texture | 0% | 0 | 0 | 0 | 0.8 μm | not measurable | NC | deposit wear on shaft |

TABLE 2

Effect of the density of the microtexturing on the wear of the shaft and bearing

| A | B | C | D | E | F | G | H | I | J | K | L | M |
|---|---|---|---|---|---|---|---|---|---|---|---|---|
| 6 | a-C:H | Copper | 8.3 | Microcavities | 5% | 50 | 0.5 | 0.01 | <0.1 µm | not measurable | C | N/A |
| 7 | a-C:H | Copper | 8.3 | Microcavities | 8% | 50 | 0.5 | 0.01 | <0.1 µm | not measurable | C | N/A |
| 8 | a-C:H | Copper | 8.3 | Microcavities | 10% | 50 | 0.5 | 0.01 | <0.1 µm | not measurable | C | N/A |
| 9 | a-C:H | Copper | 8.3 | Microcavities | 15% | 50 | 0.5 | 0.01 | <0.1 µm | not measurable | C | N/A |
| 10 | a-C:H | Copper | 8.3 | Microcavities | 20% | 50 | 0.5 | 0.01 | <0.1 µm | not measurable | C | N/A |
| 11 | a-C:H | Copper | 8.3 | Microcavities | 30% | 50 | 0.5 | 0.01 | <0.1 µm | not measurable | C | N/A |
| 12 | a-C:H | Copper | 8.3 | Microcavities | 35% | 50 | 0.5 | 0.01 | <0.1 µm | 5 µm | NC | bearing wear |
| 13 | a-C:H | Copper | 8.3 | Microcavities | 40% | 50 | 0.5 | 0.01 | <0.1 µm | 8 µm | NC | bearing wear |
| 14 | a-C:H | Steel | 5 | Microcavities | 5% | 50 | 0.5 | 0.01 | <0.1 µm | not measurable | C | N/A |
| 15 | a-C:H | Steel | 5 | Microcavities | 10% | 50 | 0.5 | 0.01 | <0.1 µm | not measurable | C | N/A |
| 16 | a-C:H | Steel | 5 | Microcavities | 20% | 50 | 0.5 | 0.01 | <0.1 µm | not measurable | C | N/A |
| 17 | a-C:H | Steel | 5 | Microcavities | 30% | 50 | 0.5 | 0.01 | <0.1 µm | not measurable | C | N/A |
| 18 | a-C:H | Steel | 5 | Microcavities | 40% | 50 | 0.5 | 0.01 | <0.1 µm | 2 µm | NC | bearing wear |
| 19 | ta-C | Copper | 16.7 | Microcavities | 5% | 50 | 0.5 | 0.01 | <0.1 µm | not measurable | C | N/A |
| 20 | ta-C | Copper | 16.7 | Microcavities | 10% | 50 | 0.5 | 0.01 | <0.1 µm | not measurable | C | N/A |
| 21 | ta-C | Copper | 16.7 | Microcavities | 20% | 50 | 0.5 | 0.01 | <0.1 µm | not measurable | C | N/A |
| 22 | ta-C | Copper | 16.7 | Microcavities | 30% | 50 | 0.5 | 0.01 | <0.1 µm | not measurable | C | N/A |
| 23 | ta-C | Copper | 16.7 | Microcavities | 40% | 50 | 0.5 | 0.01 | <0.1 µm | 15 µm | NC | bearing wear |

TABLE 3

Effect of the dimensions of the microtexturing on the wear of the shaft and bearing

| A | B | C | D | E | F | G | H | I | J | K | L | M |
|---|---|---|---|---|---|---|---|---|---|---|---|---|
| 24 | a-C:H | Copper | 8.3 | Microcavities | 10% | 50 | 0.5 | 0.01 | <0.1 µm | not measurable | C | N/A |
| 25 | a-C:H | Copper | 8.3 | Microcavities | 10% | 50 | 5 | 0.1 | <0.1 µm | not measurable | C | N/A |
| 26 | a-C:H | Copper | 8.3 | Microcavities | 10% | 50 | 10 | 0.2 | <0.1 µm | not measurable | C | N/A |
| 27 | a-C:H | Copper | 8.3 | Microcavities | 10% | 50 | 20 | 0.4 | <0.1 µm | not measurable | C | N/A |
| 28 | a-C:H | Copper | 8.3 | Microcavities | 10% | 50 | 30 | 0.6 | <0.1 µm | not measurable | C | N/A |
| 29 | a-C:H | Steel | 5 | Microcavities | 10% | 50 | 10 | 0.2 | <0.1 µm | not measurable | C | N/A |
| 30 | ta-C | Copper | 16.7 | Microcavities | 10% | 50 | 10 | 0.2 | <0.1 µm | not measurable | C | N/A |
| 31 | a-C:H | Copper | 8.3 | Microcavities | 10% | 90 | 0.5 | 0.006 | <0.1 µm | not measurable | C | N/A |
| 32 | a-C:H | Copper | 8.3 | Microcavities | 10% | 90 | 50 | 0.556 | <0.1 µm | not measurable | C | N/A |
| 33 | a-C:H | Copper | 8.3 | Microcavities | 10% | 150 | 0.5 | 0.003 | 1.3 µm | not measurable | NC | deposit wear on shaft |
| 34 | a-C:H | Copper | 8.3 | Microcavities | 10% | 150 | 5 | 0.033 | 1.4 µm | not measurable | NC | deposit wear on shaft |
| 35 | a-C:H | Copper | 8.3 | Microcavities | 10% | 50 | 0.05 | 0.001 | <0.1 µm | not measurable | C | N/A |
| 36 | a-C:H | Copper | 8.3 | Spiral texturing | 10% | 450 | 250 | 0.56 | 0.2 µm | 4 µm | NC | bearing wear |

Other embodiments of a shaft 10 equipping a mechanical system 1 according to the invention are shown in FIGS. 5 to 18. Some elements that form part of the shaft 10 are comparable to those of the first embodiment described above and, for the purposes of simplification, bear the same numerical references.

Figure 5:
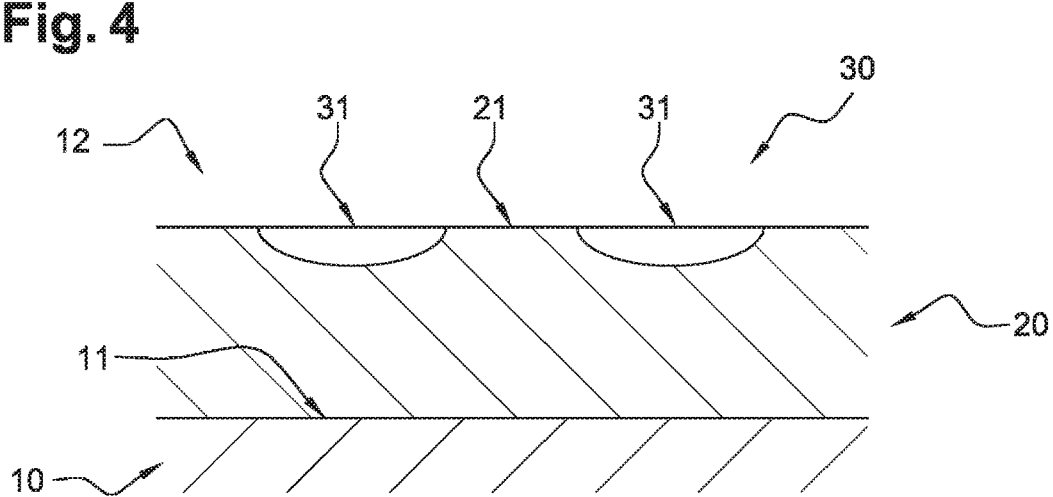
FIG. 5 is a similar view to FIG. 4, for a second embodiment of the invention.

FIG. 5 shows a shaft 10 without a sublayer between the surface 11 and the coating 20.

Figure 6:
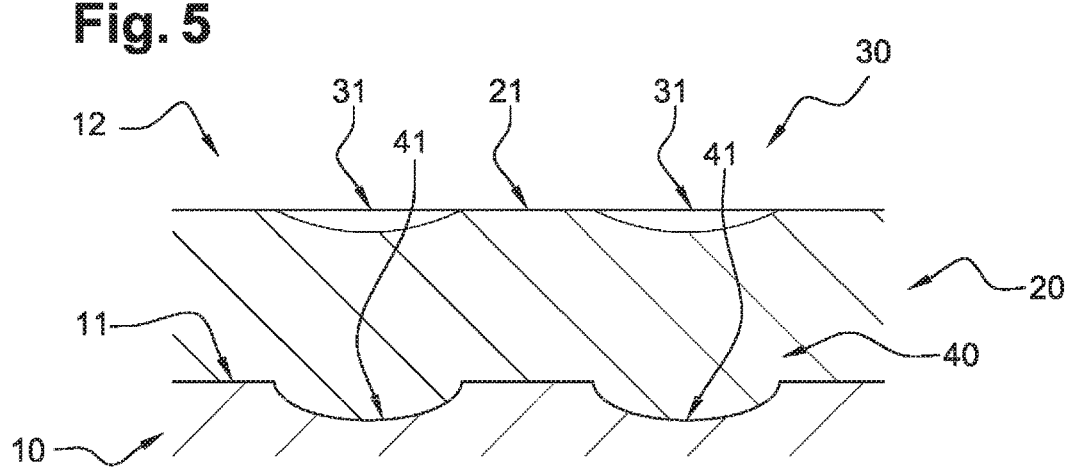
FIG. 6 is a similar view to FIG. 4, for a third embodiment of the invention.

FIG. 6 shows a shaft 10 for which the microtexturing step is carried out before the coating step. A first microtexturing 40 formed of microcavities 41 is carried out on the surface 11 of the shaft 10. The thin layer of coating 20 is then applied to the surface 11 so that the surface 21 of the coating has microtexturing 30 formed by the microcavities 31 which are located above the microcavities 41 and have substantially the same geometry. More specifically, after applying the coating 20, the resulting microcavities 31 have generally the same shape, with very slightly different dimensions given the application of the coating 20, compared to the initial microcavities 41.

Figure 7:
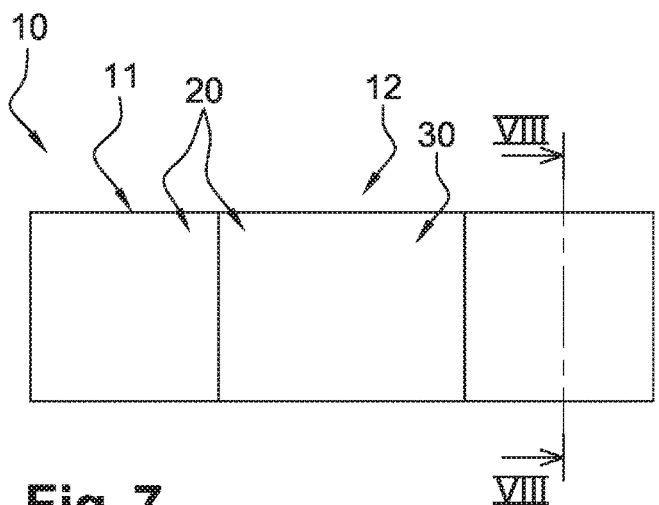
FIGS. 7 and 8 are views similar to FIGS. 2 and 3, for a fourth embodiment of the invention.
Figure 8:
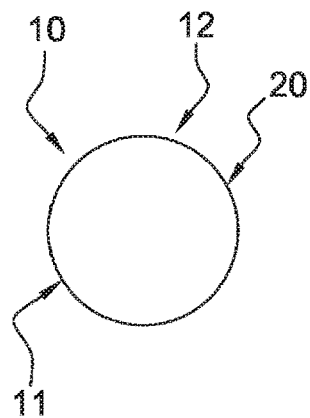

FIGS. 7 and 8 show a shaft 10 whose surface 11 is entirely covered by the coating 20, while the microtexturing 30 is carried out only in one central area 12 of the surface 11. In practice, the contact interface between the shaft 10 and the borehole 6 is located in that area 12. Thus, it is possible to reduce the duration and manufacturing cost of the shaft 10 by limiting the microtexturing 30 to that area 12.

Figure 9:
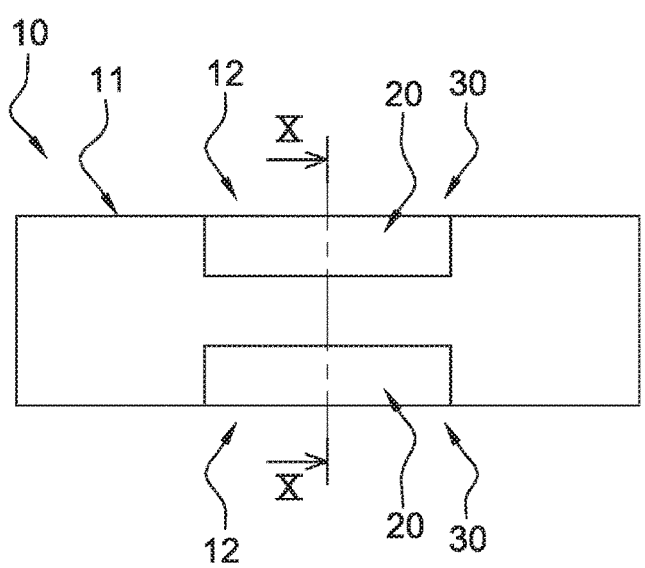
FIGS. 9 and 10 are views similar to FIGS. 2 and 3, for a fifth embodiment of the invention.
Figure 10:
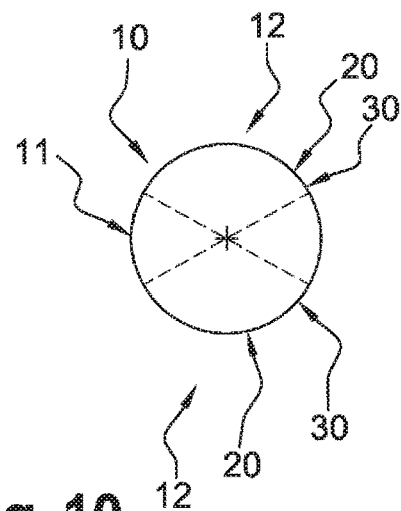

FIGS. 9 and 10 show a shaft 10 comprising two distinct areas 12 treated according to the invention. The areas 12 are located on the central part of the shaft 10, in two opposite angular sectors. Each of the areas 12 is provided with a coating and microtexturing 30, while the rest of the surface 11 does not receive treatments 20 and 30, but may receive other treatments. For instance, each angular sector may extend along an angle of between 15° and 160°. Alternatively, the shaft may comprise a single area 12, extending for example along an angular sector of between 15° and 240°.

Figure 11:
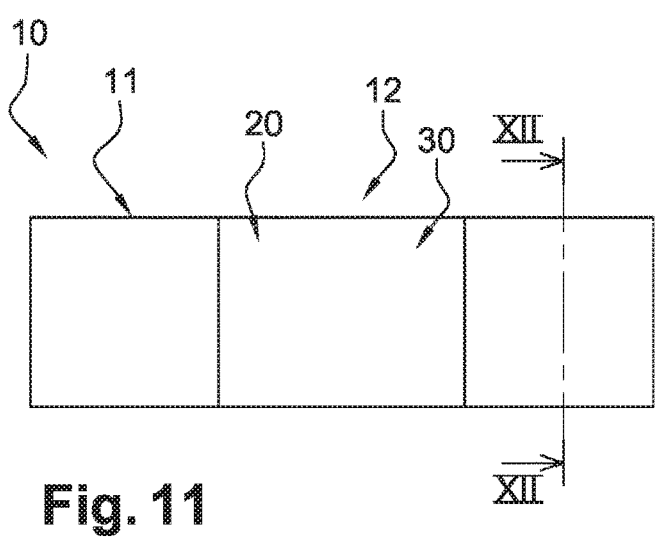
FIGS. 11 and 12 are views similar to FIGS. 2 and 3, for a sixth embodiment of the invention.
Figure 12:
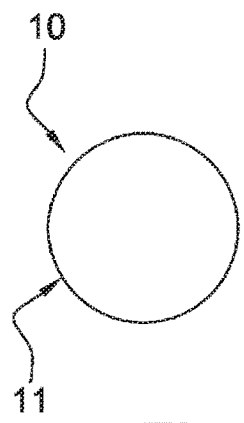

FIGS. 11 and 12 show a shaft 10 for which the treatments 20 and 30 are carried out only in a central area 12 while the rest of the surface 11 does not receive the treatments 20 and 30, but may receive other treatments.

In the context of the present invention, an "area 12" is defined as a surface of the shaft 10 covered both by the coating 20 and the microtexturing 30. The coating 20 may extend beyond said area 12. Likewise, the microtexturing 30 may extend beyond said area 12.

Preferably, the area 12 corresponds to a friction area between the shaft 10 and the bearing 4. The area 12 may extend beyond the friction area, at lengths that may vary. The area 12 may also correspond to only one part of the friction area. In this case, the rest of the friction area may be covered only with the coating 20 or only with the microtexturing 30, or not be modified at all.

Figure 13:
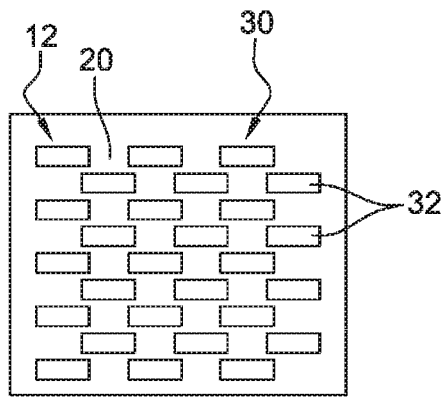
FIGS. 13, 14, 15, 16, 17 and 18 are detailed views showing different alternative embodiments of the microtexturing.

FIG. 13 shows a microtexturing 30 formed of microcavities 32 in the form of elongated striations, with a rectangular cross-section.

Figure 14:
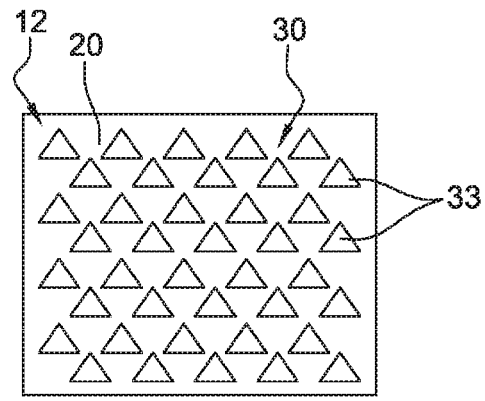

FIG. 14 shows a microtexturing 30 formed of microcavities 33 with a triangular cross-section.

Figure 15:
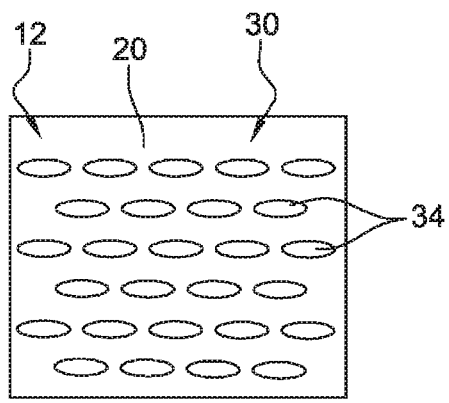

FIG. 15 shows a microtexturing 30 formed of microcavities 34 with an elliptical cross-section.

Figure 16:
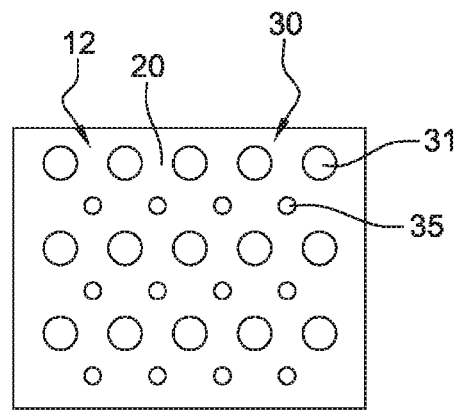

FIG. 16 shows a microtexturing 30 formed of microcavities 31 and 35 of two different types. The microcavities 31 and 35 have circular cross-sections, but the diameter of the microcavities 31 is greater than the diameter of the microcavities 35. The microcavities 31 and 34 have different dimensions.

In the context of the invention, it is assumed that the microcavities 35 of the second type have different dimensions when their dimensions are greater than double (×2=+100%) or less than half (divided by 2=−50%) the mean dimensions of the microcavities 31 of the first type. In the present case, the diameter of the microcavities 35 is less than half the diameter of the microcavities 31.

Figure 17:
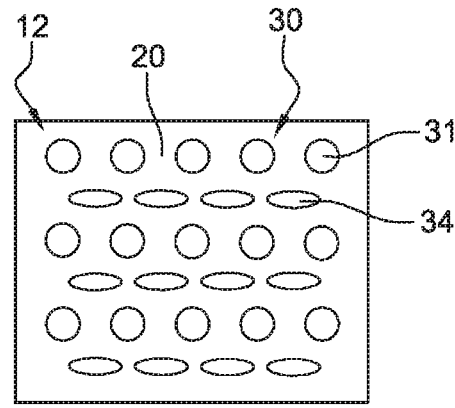

FIG. 17 shows a microtexturing 30 formed of microcavities 31 and 34 of two different types. The microcavities 31 have a circular cross-section, while the microcavities 34 have an elliptical cross-section. The microcavities 31 and 34 have different shapes.

Figure 18:
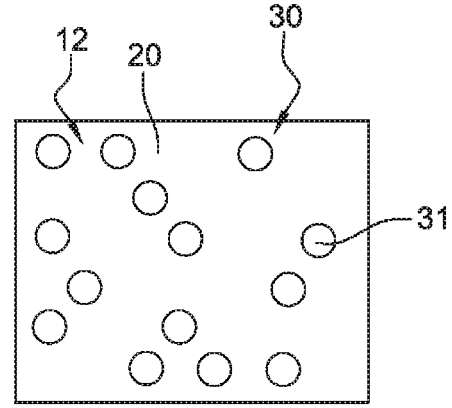

In FIGS. 16 and 17, the microcavities of different types are distributed in alternating fashion in regular rows. Alternatively, the microcavities of different types may be distributed deterministically in other geometric patterns FIG. 18 shows a microtexturing 30 formed of microcavities 31 distributed randomly, and not in a predetermined pattern. As a non limiting example, such a random pattern may be achieved by a shot-peening process.

In FIGS. 16 and 17, the microcavities of different types are distributed in alternating fashion in regular rows. Alternatively, the microcavities of different types may be distributed deterministically in other patterns, or distributed randomly as in FIG. 18.

Regardless of the embodiment, the mechanical system 1 is intended to operate under mean contact pressures below 200 MPa at the interface between the bearing 4 and the shaft 10, which comprises at least one area 12 provided both with an anti-seizure surface coating 20 having a surface hardness at least twice the surface hardness 11 of the shaft 10, and a microtexturing 30 formed of a set of separated microcavities, distributed discontinuously within said area 12.

In practice, the mechanical system 1 can be configured differently from FIGS. 1 to 18 without going beyond the scope of the invention.

Moreover, the technical characteristics of the various embodiments and variants mentioned above can, in whole or for some thereof, be combined with one another.

Thus, the mechanical system 1 and the method of making same may be adapted in terms of cost, functionality and performance.

What is claimed is:

1. A mechanical system comprising a bearing and a shaft coupled to the bearing, said mechanical system comprising an internal combustion engine;
   wherein the bearing and the shaft are subjected to mean contact pressures of less than 200 MPa;
   wherein the shaft comprises at least one area provided with:
   an anti-seizure surface coating, having a surface hardness at least twice that of the bearing, and
   a microtexturing formed by a set of separated microcavities, distributed within said area;
   wherein each of the microcavities has a greatest length of between 15 and 100 micrometers, and a depth of between 50 nm and 100 μm.

2. A mechanical system according to claim 1, wherein the anti-seizure surface coating of the shaft has a surface hardness at least three times that of the bearing.

3. A mechanical system according to claim 2, wherein the anti-seizure surface coating of the shaft has a surface hardness at least six times that of the bearing.

4. A mechanical system according to claim 1, wherein each of the microcavities has a form ratio less than or equal to 1, defined as the ratio between the depth and the greatest length.

5. A mechanical system according to claim 1 wherein the microcavities are distributed within said area with a surface density of between 5 and 30%, that surface density being defined as the ratio of the total area covered by the microcavities to the total area of said area including those microcavities.

6. A mechanical system according to claim 1, wherein the microcavities are distributed within said area in a predetermined pattern so as to form a rectangular, square, triangular, or hexagonal network of microcavities on the surface, with spacing between the center of a microcavity and the centers of neighboring microcavities within a single pattern that are between 1 and 10 times the value of a length or a diameter of the microcavities.

7. A mechanical system according to claim 1, wherein the microcavities are distributed within said area in a random pattern, with spacing between the center of a microcavity and the centers of neighboring microcavities that are randomly between 0.1 and 10 times the value of a length or a diameter of the microcavities.

8. A mechanical system according to claim 1, wherein the shaft has a cylindrical outer surface fully covered by the surface coating and the microtexturing.

9. A mechanical system according to claim 1, wherein the shaft has a cylindrical outer surface comprising a single localized area covered by the surface coating and the microtexturing, that area at least partially covering the portion of the surface intended to rub against the bearing.

10. A mechanical system according to claim 1 wherein the shaft has a cylindrical outer surface comprising several distinct areas covered by the surface coating and the microtexturing, those areas at least partially covering the portion of the surface intended to rub against the bearing.

* * * * *